US009611778B2

(12) United States Patent
Nam et al.

(10) Patent No.: US 9,611,778 B2
(45) Date of Patent: Apr. 4, 2017

(54) VEHICLE ENGINE COOLING SYSTEM

(71) Applicant: Hyundai Motor Company, Seoul (KR)

(72) Inventors: Jongwoo Nam, Seoul (KR); Hanshin Chung, Yongin-si (KR); Joonho Lee, Seoul (KR); Hyun Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 142 days.

(21) Appl. No.: 14/557,218

(22) Filed: Dec. 1, 2014

(65) Prior Publication Data

US 2015/0337714 A1 Nov. 26, 2015

(30) Foreign Application Priority Data

May 20, 2014 (KR) .................. 10-2014-0060458

(51) Int. Cl.
| | | |
|---|---|---|
| *F01P 3/22* | (2006.01) | |
| *F02M 25/07* | (2006.01) | |
| *F01P 1/02* | (2006.01) | |
| *F01P 3/02* | (2006.01) | |
| *F01P 11/04* | (2006.01) | |
| *F02B 29/04* | (2006.01) | |
| *F02M 26/06* | (2016.01) | |
| *F02M 26/22* | (2016.01) | |

(52) U.S. Cl.
CPC ........ *F01P 3/22* (2013.01); *F01P 1/02* (2013.01); *F01P 3/02* (2013.01); *F01P 11/04* (2013.01);
(Continued)

(58) Field of Classification Search
CPC .............. F02B 29/0412; F02B 29/0475; F02B 29/0418; F02B 29/0425; F02B 29/0431; F02B 29/0406; F02B 29/0437; F02M 26/28; F02M 26/24; F02M 26/05; F02M 35/161; F02M 26/21; F01P 7/165; F01P 2060/02;
(Continued)

(56) References Cited

U.S. PATENT DOCUMENTS 4,273,082 A * 6/1981 Tholen .................. F01P 11/08
123/41.31
4,723,594 A * 2/1988 Koehr ................... B60K 11/04
123/196 AB
(Continued)

FOREIGN PATENT DOCUMENTS

JP 3861968 B2 10/2006
JP 2008-525701 A 7/2008
(Continued)

*Primary Examiner* — Long T Tran
(74) *Attorney, Agent, or Firm* — Morgan, Lewis & Bockius LLP

(57) ABSTRACT

A vehicle engine cooling system may include a high temperature radiator in which a high temperature coolant for cooling an engine by using ambient air flows, a low temperature radiator in which a low temperature coolant for cooling a water-cooled condenser by using ambient air flows, an integrated cooler configured to cool a low pressure EGR gas and air which has passed through a turbocharger, a high temperature radiator circulation line provided to allow the high temperature coolant to circulate the high temperature radiator, the engine, and the integrated cooler, a low temperature radiator circulation line provided to allow the low temperature coolant to circulate the low temperature radiator, the condenser, and the integrated cooler, and a plurality of control valves provided on the high temperature radiator circulation line and the low temperature radiator circulation line.

20 Claims, 7 Drawing Sheets

(52) U.S. Cl.
CPC .. *F02B 29/0468* (2013.01); *F01P 2003/2214* (2013.01); *F02B 29/0412* (2013.01); *F02B 29/0475* (2013.01); *F02M 26/06* (2016.02); *F02M 26/22* (2016.02); *Y02T 10/146* (2013.01); *Y02T 10/166* (2013.01)

(58) Field of Classification Search
CPC ............. F01P 2003/187; F01P 2060/04; F01P 2060/14; F01P 2003/182; F01P 2003/185; F01P 11/10; F01P 9/04
USPC ... 123/41.2, 41.1, 41.01, 41.21, 41.3, 41.31, 123/41.33, 41.48, 41.49; 165/44, 140
See application file for complete search history.

(56) References Cited

U.S. PATENT DOCUMENTS

| | | | | |
|---|---|---|---|---|
| 5,408,843 | A * | 4/1995 | Lukas | B60H 1/3227 62/244 |
| 5,520,015 | A * | 5/1996 | Lukas | B60H 1/3227 165/140 |
| 6,116,026 | A | 9/2000 | Freese | |
| 2011/0000446 | A1* | 1/2011 | Kardos | F01P 7/165 123/41.02 |
| 2011/0000469 | A1* | 1/2011 | Lauberts | F02B 29/0412 123/564 |
| 2011/0239996 | A1* | 10/2011 | Wikstrom | F02M 26/33 123/568.12 |
| 2012/0137993 | A1* | 6/2012 | Kim | F01P 7/165 123/41.11 |

FOREIGN PATENT DOCUMENTS

| | | |
|---|---|---|
| JP | 2013-56615 A | 3/2013 |
| JP | 2013-119384 A | 6/2013 |
| JP | 5240444 B2 | 7/2013 |
| KR | 10-0190514 B1 | 6/1999 |
| KR | 10-2012-0093024 A | 8/2012 |

* cited by examiner

VEHICLE ENGINE COOLING SYSTEM

CROSS-REFERENCE TO RELATED APPLICATION

The present application claims priority to Korean Patent Application No. 10-2014-0060458 filed May 20, 2014, the entire contents of which is incorporated herein for all purposes by this reference.

BACKGROUND OF THE INVENTION

Field of the Invention

The present invention relates to a vehicle engine cooling system and, more particularly, to a vehicle engine cooling system capable of enhancing cooling performance of a vehicle.

Description of Related Art

A vehicle is structurally divided into a vehicle body and a chassis.

Among them, the vehicle body is a part including an engine room and forming an appearance of a vehicle, and, in general, an engine, a transmission, a cooling device, various accessory elements, and the like, are installed in the engine room.

The engine room is a space in which an engine heated to have a high temperature during running is installed, and thus, in order to effectively cool the engine and prevent heat damage, optimization of heat flow with respect to an engine room layout needs to be essentially considered at the stage of vehicle development.

Vehicle manufacturers have made efforts to improve cooling performance through various studies such as analysis of an influence of heat flow factors on a layout within an engine room, or the like.

Namely, optimization of heat flow is promoted by improving factors affecting heat flow within an engine room, namely, by increasing a span of left and right side members and a horizontal distance of a strut housing, simplifying and optimally disposing components of an engine room and accessory elements, tilting a cooling fan, optimizing an air guide structure, and the like, through which a certain level of improvement, such as cooling and prevention of heat damage, and the like, is achieved.

However, simple optimization of heat flow with respect to an engine room layout can improve partial performance such as engine cooling and prevention of heat damage but it cannot obtain a sufficient improvement in terms of an overall engineering performance of an engine room, namely, in a comprehensive aspect such as fuel efficiency, emission, acoustics, aerodynamics, and the like.

Also, the related art obtains desired effects of improving cooling performance and efficiency through optimization of a structure and disposition of a cooling module (tilting of a cooling fan, or the like), application of an active air flap, optimization of a disposition and structure of an air guide, and the like, but improvement effects and range thereof in a comprehensive aspect of an engine room are limited and, actually, there is a limitation in distributing heat flow to the right position due to complicated engine room flow characteristics.

Also, in general, an engine cover covering an upper portion of an engine is installed in an engine room and an under cover is installed in a lower portion of the engine room in relation to a reduction of noise of a vehicle, but, these are merely related to improvement and optimization of structures or improvement of materials in terms of a reduction in noise, discharge of heat, and the like, with respect to the members, but without a consideration of fuel efficiency, aerodynamics, and the like.

An optimization structure for an engine room heat management advanced by optimizing heat flow of an engine room in terms of cooling is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle engine cooling system having advantages of enhancing cooling performance of a vehicle.

According to various aspects of the present invention, a vehicle engine cooling system may include a high temperature radiator in which a high temperature coolant for cooling an engine by using ambient air flows, a low temperature radiator in which a low temperature coolant for cooling a water-cooled condenser by using ambient air flows, an integrated cooler cooling a low pressure EGR gas and air which has passed through a turbocharger by using the coolant of the high temperature radiator and the coolant of the low temperature radiator, a high temperature radiator circulation line provided to allow the high temperature coolant to circulate the high temperature radiator, the engine, and the integrated cooler, a low temperature radiator circulation line provided to allow the low temperature coolant to circulate the low temperature radiator, the condenser, and the integrated cooler, and a plurality of control valves provided on the high temperature radiator circulation line and the low temperature radiator circulation line to control flows of the high temperature coolant and the low temperature coolant.

The integrated cooler may include a low temperature unit provided with a low temperature coolant inlet through which the low temperature coolant is introduced and a low temperature coolant outlet through which the low temperature coolant is discharged; and a high temperature unit provided with a high temperature coolant inlet through which the high temperature coolant is introduced and a high temperature coolant outlet through which the high temperature coolant is discharged, in which the air may be introduced to the integrated cooler and flow in a direction from the high temperature coolant inlet to the low temperature coolant inlet and the low pressure EGR gas may be introduced to the integrated cooler and flow in a direction from the high temperature coolant outlet to the low temperature coolant outlet.

The integrated cooler may include an insulating wall blocking heat transmission between the air and the low pressure EGR gas.

The vehicle engine cooling system may further include an ambient air intake allowing ambient air in front of a vehicle to be introduced to an engine room and side ducts formed to be symmetrical to guide ambient air in front of the vehicle toward a wheel of the vehicle, wherein the high temperature radiator may include a central high temperature radiator provided in the ambient air intake and first and second auxiliary high temperature radiators provided in both side ducts, the low temperature radiator may include a central low temperature radiator provided in the ambient air intake and first and second auxiliary low temperature radiators respectively provided in both side ducts, and the plurality of valves may include a first valve controlling flow of a coolant that passes through the first auxiliary low temperature radiator, a second valve controlling flow of a coolant that passes through the second auxiliary low temperature radiator, a third valve controlling flow of a coolant that passes through the first auxiliary high temperature radiator, and a fourth valve controlling flow of a coolant that passes through the second auxiliary high temperature radiator.

The vehicle engine cooling system may further include an active air flap provided in the ambient air intake to selectively block flow of ambient air.

The low temperature radiator circulation line may include a first low temperature circulation line connecting the first auxiliary low temperature radiator and the central low temperature radiator, a second low temperature circulation line connecting the central low temperature radiator and the second auxiliary low temperature radiator and having the second valve, a third low temperature circulation line connecting the second auxiliary low temperature radiator and the condenser, a fourth low temperature circulation line diverging from the second valve and connected to the third low temperature circulation line, a fifth low temperature circulation line connecting the condenser and the integrated cooler, a sixth low temperature circulation line connecting the integrated cooler and the first auxiliary low temperature radiator and having the first valve, and a seventh low temperature circulation line diverging from the first valve and connected to the first low temperature circulation line.

When a temperature of the low temperature coolant transmitted from the integrated cooler is lower than a preset first temperature, the first valve may block flow of the low temperature coolant to the first auxiliary low temperature radiator.

When a temperature of the low temperature coolant transmitted from the central low temperature radiator is lower than a preset second temperature, the second valve may allow the low temperature coolant to flow to the second auxiliary low temperature radiator.

The high temperature radiator circulation line may include a first high temperature circulation line connecting the first auxiliary high temperature radiator and the central high temperature radiator, a second high temperature circulation line connecting the central high temperature radiator and the second auxiliary high temperature radiator and having the fourth valve, a third high temperature circulation line connecting the second auxiliary high temperature radiator and the engine, a fourth high temperature circulation line diverging from the fourth valve and connected to the third high temperature circulation line, a fifth high temperature line connecting the fourth high temperature circulation line and the integrated cooler, a sixth high temperature circulation line connecting the engine and the first high temperature circulation line and having the third valve, a seventh high temperature circulation line connecting the integrated cooler and the third valve, and an eighth high temperature circulation line connecting the third valve and the first auxiliary high temperature radiator.

When a temperature of the high temperature coolant transmitted from the integrated cooler is lower than a preset third temperature, the third valve may block flow of the high temperature coolant to the first auxiliary high temperature radiator. When a temperature of the high temperature coolant transmitted from the central high temperature radiator is lower than a preset fourth temperature, the fourth valve may block flow of the high temperature coolant to the second auxiliary high temperature radiator.

The low temperature radiator may be provided in front of the high temperature radiator in the vehicle.

Coolant pumps may be provided respectively on the high temperature radiator circulation line and the low temperature radiator circulation line.

One-way valves may be provided respectively on the high temperature radiator circulation line and the low temperature radiator circulation line in order to prevent the coolants flowing therethrough from flowing backward.

According to various aspects of the present invention, a vehicle engine cooling system may include an ambient air intake allowing ambient air in front of a vehicle to be introduced to an engine room, side ducts formed to be symmetrical to guide ambient air in front of the vehicle toward a wheel of the vehicle, a high temperature radiator including a central high temperature radiator provided in the ambient air intake and first and second auxiliary high temperature radiators respectively provided in both side ducts, a low temperature radiator including a central low temperature radiator provided in the ambient air intake and first and second auxiliary low temperature radiators respectively provided in both side ducts, an integrated cooler configured to cool a low pressure EGR gas and air which has passed through a turbocharger by using a coolant of the high temperature radiator and a coolant of the low temperature radiator, a high temperature radiator circulation line provided to allow the high temperature coolant to circulate the high temperature radiator, an engine, and the integrated cooler, a low temperature radiator circulation line provided to allow the low high temperature coolant to circulate the low temperature radiator, a condenser, and the integrated cooler; and a plurality of control valves configured to control flow of the coolants.

The plurality of control valves may include a first valve configured to control flow of a coolant that passes through the first auxiliary low temperature radiator, a second valve configured to control flow of a coolant that passes through the second auxiliary low temperature radiator, a third valve configured to control flow of a coolant that passes through the first auxiliary high temperature radiator, and a fourth valve configured to control flow of a coolant that passes through the second auxiliary high temperature radiator.

The integrated cooler may include a low temperature unit provided with a low temperature coolant inlet through which the low temperature coolant is introduced and a low temperature coolant outlet through which the low temperature coolant is discharged, and a high temperature unit provided with a high temperature coolant inlet through which the high temperature coolant is introduced and a high temperature coolant outlet through which the high temperature coolant is discharged, in which the air may be introduced to the integrated cooler and flows in a direction from the high temperature coolant inlet to the low temperature coolant inlet and the low pressure EGR gas may be introduced to the integrated cooler and flow in a direction from the high temperature coolant outlet to the low temperature coolant outlet.

The integrated cooler may include an insulating wall configured to block heat transmission between the air and the low pressure EGR gas.

The low temperature radiator circulation line may include a first low temperature circulation line connecting the first auxiliary low temperature radiator and the central low temperature radiator, a second low temperature circulation line connecting the central low temperature radiator and the second auxiliary low temperature radiator and having the second valve, a third low temperature circulation line connecting the second auxiliary low temperature radiator and the condenser, a fourth low temperature circulation line diverging from the second valve and connected to the third low temperature circulation line, a fifth low temperature circulation line connecting the condenser and the integrated cooler, a sixth low temperature circulation line connecting the integrated cooler and the first auxiliary low temperature radiator and having the first valve, and a seventh low temperature circulation line diverging from the first valve and connected to the first low temperature circulation line.

When a temperature of the low temperature coolant transmitted from the integrated cooler is lower than a preset first temperature, the first valve may block flow of the low temperature coolant to the first auxiliary low temperature radiator, and when a temperature of the low temperature coolant transmitted from the central low temperature radiator is lower than a preset second temperature, the second valve may block flow of the low temperature coolant to the second auxiliary low temperature radiator.

The high temperature radiator circulation line may include a first high temperature circulation line connecting the first auxiliary high temperature radiator and the central high temperature radiator, a second high temperature circulation line connecting the central high temperature radiator and the second auxiliary high temperature radiator and having the fourth valve, a third high temperature circulation line connecting the second auxiliary high temperature radiator and the engine, a fourth high temperature circulation line diverging from the fourth valve and connected to the third high temperature circulation line, a fifth high temperature line connecting the fourth high temperature circulation line and the integrated cooler, a sixth high temperature circulation line connecting the engine and the first high temperature circulation line and having the third valve, a seventh high temperature circulation line connecting the integrated cooler and the third valve, and an eighth high temperature circulation line connecting the third valve and the first auxiliary high temperature radiator.

When a temperature of the high temperature coolant transmitted from the integrated cooler is lower than a preset third temperature, the third valve may block flow of the high temperature coolant to the first auxiliary high temperature radiator, and when a temperature of the high temperature coolant transmitted from the central high temperature radiator is lower than a preset fourth temperature, the fourth valve may block flow of the high temperature coolant to the second auxiliary high temperature radiator.

The vehicle engine cooling system may further include an active air flap provided in the ambient air intake to selectively block flow of ambient air.

According to the vehicle engine cooling system of various embodiments of the present invention, the number of components can be reduced and cooling performance of a vehicle can be enhanced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
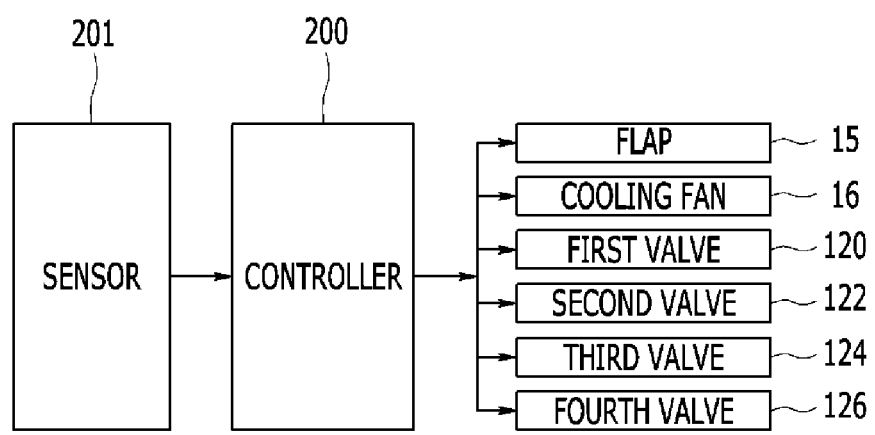
FIG. 1 is a block diagram of an exemplary vehicle engine cooling system according to the present invention.
Figure 2:
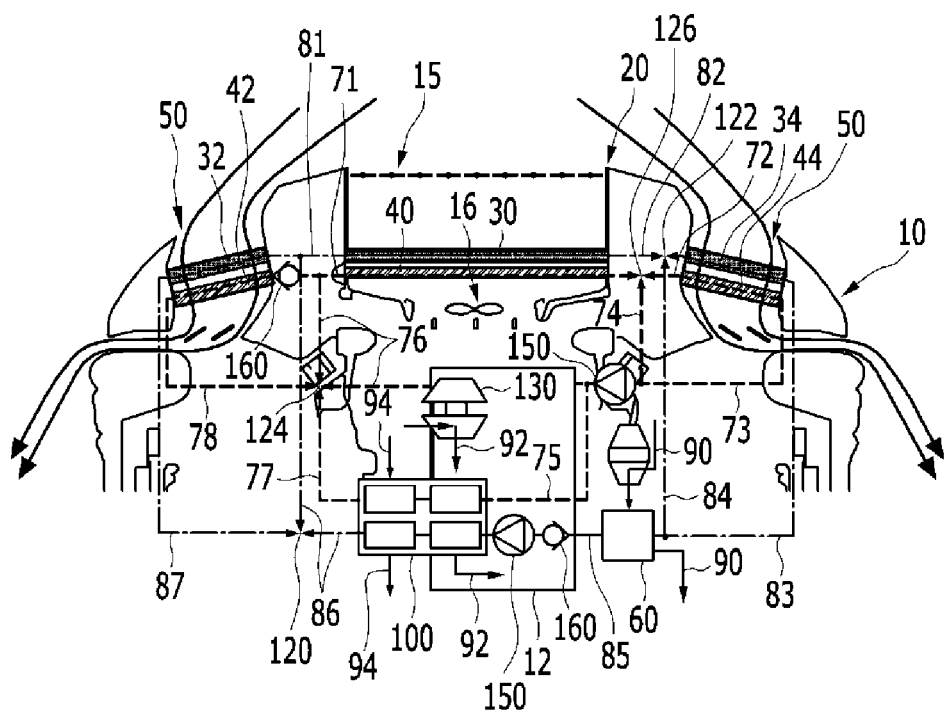
FIG. 2 is a view illustrating the exemplary vehicle engine cooling system according to the present invention.
Figure 3:
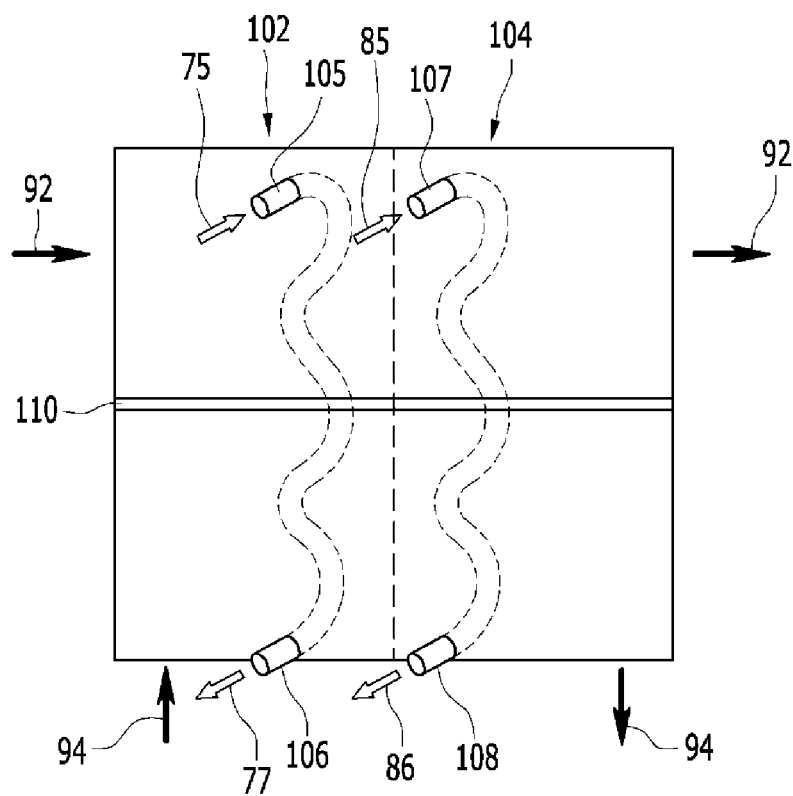
FIG. 3 is a view illustrating an integrated cooler applied to the exemplary vehicle engine cooling system according to the present invention.

FIG. 1 is a block diagram of a vehicle engine cooling system according to various embodiments of the present invention, FIG. 2 is a view illustrating the vehicle engine cooling system according to various embodiments of the present invention, and FIG. 3 is a view illustrating an integrated cooler applied to the vehicle engine cooling system according to various embodiments of the present invention.

Referring to FIG. 1, FIG. 2, and FIG. 3, a vehicle engine cooling system according to various embodiments of the present invention includes a high temperature radiator in which a high temperature coolant for cooling an engine 12 of a vehicle 10 by using ambient air flows, a low temperature radiator in which a low temperature coolant for cooling a water-cooled condenser 60 by using ambient air flows, an integrated cooler 100 cooling a low pressure EGR gas and air which has passed through a turbocharger by using the coolant of the high temperature radiator and the coolant of the low temperature radiator, a high temperature radiator circulation line 70 provided to allow the high temperature coolant to circulate the high temperature radiator, the engine 12, and the integrated cooler 100, a low temperature radiator circulation line 80 provided to allow the low temperature coolant to circulate the low temperature radiator, the condenser 60, and the integrated cooler 100, and a plurality of control valves provided on the high temperature radiator circulation line 70 and the low temperature radiator circulation line 80 to control flows of the high temperature coolant and the low temperature coolant.

The vehicle 10 includes an ambient air intake 20 allowing ambient air in front of the vehicle to be introduced to an engine room and side ducts 50 formed to be symmetrical to guide ambient air in front of the vehicle toward a wheel of the vehicle.

The high temperature radiator includes a central high temperature radiator 40 provided in the ambient air intake 20 and first and second auxiliary high temperature radiators 42 and 44 provided in both side ducts 50.

The low temperature radiator includes a central low temperature radiator 30 provided in the ambient air intake 20 and first and second auxiliary low temperature radiators 32 and 34 respectively provided in both side ducts 50.

Since a temperature of the low temperature coolant flowing in the low temperature radiators 30, 32, and 34 is lower than the high temperature coolant flowing in the high temperature radiators 40, 42, and 44, the low temperature radiators 30, 32, and 34 are provided in front of the high temperature radiators 40, 42, and 44 in the vehicle to increase cooling efficiency.

The vehicle engine cooling system may include an active air flap 15 provided in the ambient air intake 20 to selectively block flow of ambient air, and the active air flap 15 controls flow of air introduced to an interior of the vehicle under the control of the controller 200. The controller 200 determines an operational state of the vehicle according to signals from a plurality of sensors 201 that measure the operational state of the vehicle and output corresponding signals, and controls an operation of the active air flap 15.

The plurality of sensors 201 may include, for example, an atmospheric temperature sensor measuring an atmospheric temperature and outputting a corresponding signal, a speed sensor measuring a speed of a vehicle and outputting a corresponding signal, an air-conditioning pressure sensor measuring internal air-conditioning pressure and outputting a corresponding signal, an air-conditioning switch sensor measuring an operational signal of an air-conditioning switch and outputting a corresponding signal, a refrigerant temperature sensor measuring a temperature of a refrigerant and outputting a corresponding signal, and a coolant temperature sensor measuring a temperature of a coolant and outputting a corresponding signal.

The plurality of valves include a first valve 120 controlling flow of a coolant that passes through the first auxiliary low temperature radiator 32, a second valve 122 controlling flow of a coolant that passes through the second auxiliary low temperature radiator 34, a third valve 124 controlling flow of a coolant that passes through the first auxiliary high temperature radiator 42, and a fourth valve 126 controlling flow of a coolant that passes through the second auxiliary high temperature radiator 44.

The low temperature radiator circulation line 80 includes a first low temperature circulation line 81 connecting the first auxiliary low temperature radiator 32 and the central low temperature radiator 30, a second low temperature circulation line 82 connecting the central low temperature radiator 30 and the second auxiliary low temperature radiator 34 and having the second valve 122, a third low temperature circulation line 83 connecting the second auxiliary low temperature radiator 34 and the condenser 60, a fourth low temperature circulation line 84 diverging from the second valve and connected to the third low temperature circulation line 83, a fifth low temperature circulation line 85 connecting the condenser 60 and the integrated cooler 100, a sixth low temperature circulation line 86 connecting the integrated cooler 100 and the first auxiliary low temperature radiator 32 and having the first valve 120, and a seventh low temperature circulation line 87 diverging from the first valve and connected to the first low temperature circulation line 81.

The high temperature radiator circulation line 70 includes a first high temperature circulation line 71 connecting the first auxiliary high temperature radiator 42 and the central high temperature radiator 40, a second high temperature circulation line 72 connecting the central high temperature radiator 40 and the second auxiliary high temperature radiator 44 and having the fourth valve 126, a third high temperature circulation line 73 connecting the second auxiliary high temperature radiator 44 and the engine 12, a fourth high temperature circulation line 74 diverging from the fourth valve 126 and connected to the third high temperature circulation line 73, a fifth high temperature line 75 connecting the fourth high temperature circulation line 74 and the integrated cooler 100, a sixth high temperature circulation line 76 connecting the engine 12 and the first high temperature circulation line 71 and having the third valve 124, a seventh high temperature circulation line 77 connecting the integrated cooler 100 and the third valve 124, and an eighth high temperature circulation line 78 connecting the third valve 124 and the first auxiliary high temperature radiator 42.

Coolant pumps 50 may be provided respectively on the high temperature radiator circulation line 70 and the low temperature radiator circulation line 80. In the drawings, it is illustrated that the coolant pumps 50 are provided respectively on the third high temperature circulation line 73 and the fifth low temperature circulation line 85, but the present invention is not limited thereto and the coolant pumps 50 may be provided in any positions as long as they can control flow of the coolants respectively flowing in the high temperature radiator circulation line 70 and the low temperature radiator circulation line 80. The coolant pumps 50 may be electric pumps whose operation capacity is controlled, and since flow of a coolant that passes through the first auxiliary low temperature radiator 32, the second auxiliary low temperature radiator 34, the first auxiliary high temperature radiator 42, the second auxiliary high temperature radiator 44 is controlled according to operations of the first valve 120, the second valve 122, the third valve 124, and the fourth valve 126, varying an operation load of each of the coolant pumps 50, thus enhancing fuel efficiency.

The first valve 120, the second valve 122, the third valve 124, and the fourth valve 126 may be mechanical valves mechanically operating according to temperatures of introduced coolants, or may be electric valves whose operations are controlled by measuring a temperature of a coolant by the controller 200. Configuration and operation thereof are obvious to a person skilled in the art, and thus, a detailed description thereof will be omitted.

One-way valves 160 may be provided on the high temperature radiator circulation line 70 and the low temperature radiator circulation line 80, respectively, in order to prevent the coolant from flowing backward.

The condenser 60 is connected to a coolant line 90 in which a refrigerant used for an air-conditioner of the vehicle flows, and the fifth low temperature circulation line 85, and the refrigerant is cooled by the low temperature coolant flowing in the fifth low temperature circulation line 85.

An air line 92 in which air which has passed through the turbocharger 130 or a mixture gas of a high temperature EGR gas and air flows and a low pressure EGR line 94 in which a low pressure EGR gas flows are connected to the integrated cooler 100 and cooled by the low temperature coolant and the high temperature coolant.

Referring to FIG. 2 and FIG. 3, the integrated cooler 100 includes a low temperature unit 104 including a low temperature coolant inlet 107 through which the low temperature coolant is introduced and a low temperature coolant outlet 108 through which the low temperature coolant is discharged, and a high temperature unit 102 including a high temperature coolant inlet 105 through which the high temperature coolant is introduced and a high temperature coolant outlet 106 through which the high temperature coolant is discharged.

The high temperature coolant inlet 105 is connected to the fifth high temperature circulation line 75, the high temperature coolant outlet 106 is connected to the seventh high temperature circulation line 77, the low temperature coolant inlet 107 is connected to the fifth low temperature circulation line 85, and the low temperature coolant outlet 108 is connected to the sixth low temperature circulation line 86.

Namely, the air may be introduced to the integrated cooler 100 and flow from the high temperature coolant inlet 105 to the low temperature coolant inlet 107, and the low pressure EGR gas may be introduced to the integrated cooler 100 and flow from the high temperature coolant outlet 106 to the low temperature coolant outlet 108.

The integrated cooler 100 may include an insulating wall 110 blocking heat transmission between the air and the low pressure EGR gas.

Since a temperature of the high temperature coolant is higher than that of the low temperature coolant and a temperature of the low pressure EGR gas is higher than that of the air, cooling efficiency of cooling between the air and the low pressure EGR gas by using the high temperature coolant and the low temperature coolant can be increased.

FIG. 4, FIG. 5, FIG. 6, and FIG. 7 are views illustrating operations of the vehicle engine cooling system according to various embodiments of the present invention, respectively.

Hereinafter, an operation of the vehicle engine cooling system according to various embodiments of the present invention will be described with reference to FIG. 4, FIG. 5, FIG. 6, and FIG. 7.

Figure 4:
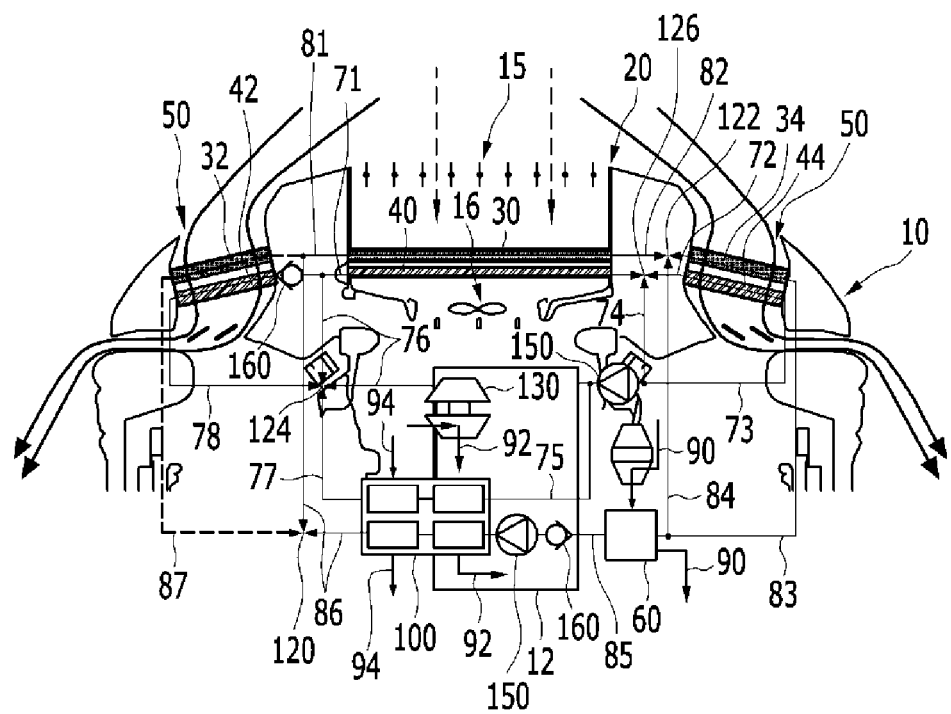
FIG. 4, FIG. 5, FIG. 6, and FIG. 7 are views illustrating operations of the exemplary vehicle engine cooling system according to the present invention.

Referring to FIG. 4, the controller 200 may open or close the active air flap 15 according to an operational state of the vehicle. For example, when the engine 12 needs to be warmed up for a predetermined period of time after the engine 12 of the vehicle is started, when the engine 12 is turned off and a temperature of the engine 12 needs to be maintained, when the vehicle is running at a low speed and low load state, and the like, the controller 200 closes the active air flap 15 and turns off the operation of the cooling fan 16.

The corresponding conditions may be stored in a preset map in advance, and the controller 200 may compare an operational state of the vehicle with the map to close or open the active air flap 15, or turn off or turn on the operation of the cooling fan 16.

Also, referring to FIG. 4, when the temperature of the low temperature coolant transmitted from the integrated cooler 100 is lower than a preset first temperature, the first valve 120 may block flow of the low temperature coolant to the first auxiliary low temperature radiator 32.

For example, the preset first temperature may range from approximately 80 to 90, and when the temperature of the low temperature coolant is lower than the preset first temperature, additional cooling is not required, and thus, the low temperature coolant is blocked from flowing to the first auxiliary low temperature radiator 32, thus preventing overcooling. Here, since the coolant does not flow to the seventh low temperature circulation line 87, a required load of the coolant pump 150 is reduced, enhancing mileage (or fuel efficiency).

Figure 5:
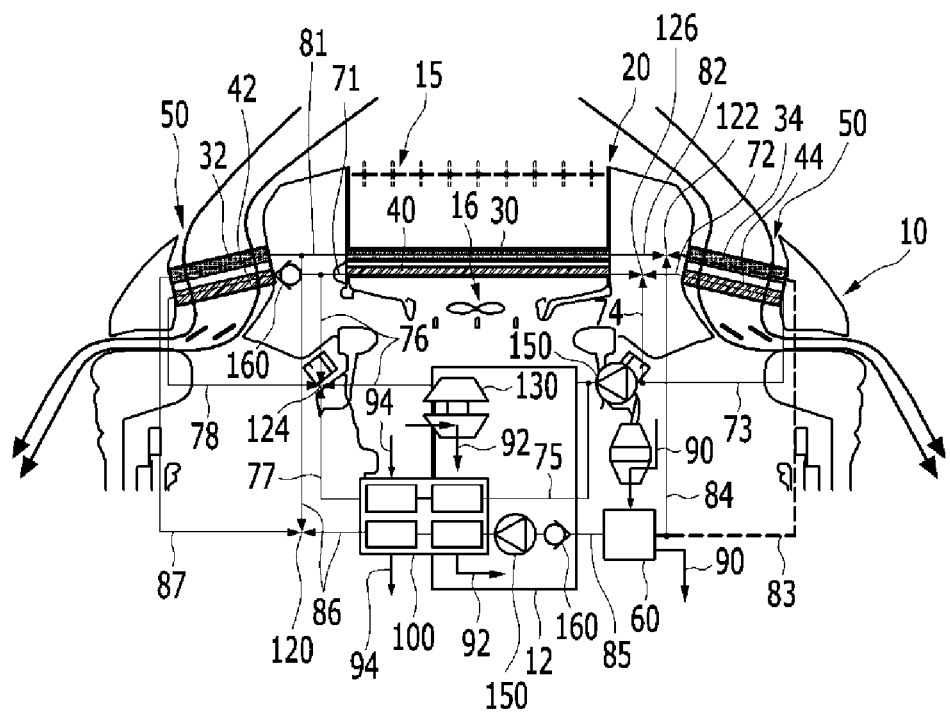

Referring to FIG. 5, when the temperature of the low temperature coolant transmitted from the central low temperature radiator 30 is lower than a preset second temperature, the second valve 122 may block flow of the low temperature coolant to the second auxiliary low temperature radiator 34.

For example, the preset second temperature may range from approximately 80 to 90, and when the temperature of the low temperature coolant is lower than the preset second temperature, additional cooling is not required, and thus, the low temperature coolant is blocked from flowing to the second auxiliary low temperature radiator 34, thus preventing overcooling. Here, since the coolant does not flow to the third low temperature circulation line 83, a required load of the coolant pump 150 is reduced, enhancing mileage (or fuel efficiency).

Figure 6:
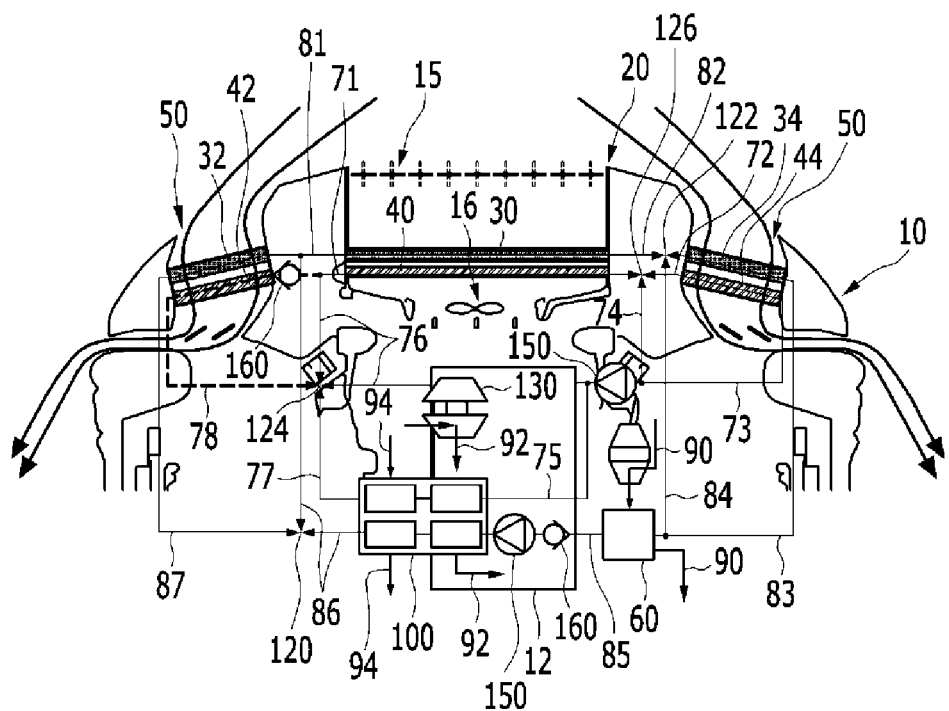

Referring to FIG. 6, when the temperature of the high temperature coolant transmitted from the integrated cooler 100 is lower than a preset third temperature, the third valve 124 may block flow of the high temperature coolant to the first auxiliary high temperature radiator 42.

For example, the preset third temperature may range from approximately 100 to 110, and when the temperature of the high temperature coolant is lower than the preset third temperature, additional cooling is not required, and thus, the high temperature coolant is blocked from flowing to the first auxiliary high temperature radiator 42, thus preventing overcooling. Here, since the coolant does not flow to the eighth high temperature circulation line 78, a required load of the coolant pump 150 is reduced, enhancing mileage (or fuel efficiency).

Figure 7:
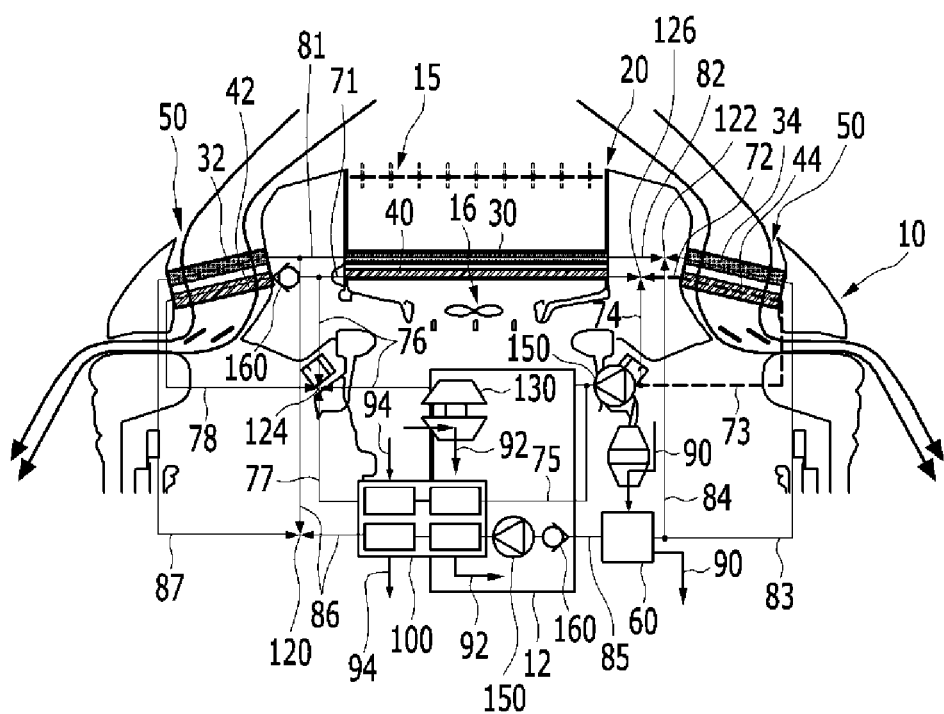

Referring to FIG. 7, when the temperature of the high temperature coolant transmitted from the central high temperature radiator 40 is lower than a preset fourth temperature, the fourth valve 126 may block flow of the high temperature coolant to the second auxiliary high temperature radiator 44.

For example, the preset fourth temperature may range from approximately 100 to 110, and when the temperature of the high temperature coolant is lower than the preset fourth temperature, additional cooling is not required, and thus, the high temperature coolant is blocked from flowing to the second auxiliary high temperature radiator 44, thus preventing overcooling. Here, since the coolant does not flow to the third high temperature circulation line 73, a required load of the coolant pump 150 is reduced, enhancing mileage (or fuel efficiency).

As described above, according to the vehicle engine cooling system of various embodiments of the present invention, cooling efficiency can be maintained, while reducing the number of coolers, and a layout of the engine can be simplified. In addition, required power can be reduced, while maintaining cooling efficiency, enhancing mileage (or fuel efficiency).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle engine cooling system comprising:
    a high temperature radiator in which a high temperature coolant for cooling an engine by using ambient air flows;
    a low temperature radiator in which a low temperature coolant for cooling a water-cooled condenser by using ambient air flows;
    an integrated cooler configured to cool a low pressure EGR gas and air which has passed through a turbocharger by using the coolant of the high temperature radiator and the coolant of the low temperature radiator;
    a high temperature radiator circulation line provided to allow the high temperature coolant to circulate the high temperature radiator, the engine, and the integrated cooler;
    a low temperature radiator circulation line provided to allow the low temperature coolant to circulate the low temperature radiator, the condenser, and the integrated cooler;
    a plurality of control valves provided on the high temperature radiator circulation line and the low temperature radiator circulation line to control flows of the high temperature coolant and the low temperature coolant; and
    an ambient air intake configured to allow ambient air in front of a vehicle to be introduced to an engine room and side ducts formed to be symmetrical to guide ambient air in front of the vehicle toward a wheel of the vehicle,
    wherein the high temperature radiator includes:
        a central high temperature radiator provided in the ambient air intake and first and second auxiliary high temperature radiators provided in both side ducts, and wherein the low temperature radiator includes:
        a central low temperature radiator provided in the ambient air intake and first and second auxiliary low temperature radiators respectively provided in both side ducts.

2. The vehicle engine cooling system of claim 1, wherein the integrated cooler includes:
    a low temperature unit provided with a low temperature coolant inlet through which the low temperature coolant is introduced and a low temperature coolant outlet through which the low temperature coolant is discharged; and
    a high temperature unit provided with a high temperature coolant inlet through which the high temperature coolant is introduced and a high temperature coolant outlet through which the high temperature coolant is discharged,
    wherein the air is introduced to the integrated cooler and flows in a direction from the high temperature coolant inlet to the low temperature coolant inlet and
    the low pressure EGR gas is introduced to the integrated cooler and flows in a direction from the high temperature coolant outlet to the low temperature coolant outlet.

3. The vehicle engine cooling system of claim 1, wherein the plurality of control valves include:
    a first valve configured to control flow of a coolant that passes through the first auxiliary low temperature radiator;
    a second valve configured to control flow of a coolant that passes through the second auxiliary low temperature radiator;
    a third valve configured to control flow of a coolant that passes through the first auxiliary high temperature radiator; and
    a fourth valve configured to control flow of a coolant that passes through the second auxiliary high temperature radiator.

4. The vehicle engine cooling system of claim 3, further comprising:
    an active air flap provided in the ambient air intake to selectively block flow of ambient air.

5. The vehicle engine cooling system of claim 3, wherein the low temperature radiator circulation line includes:
    a first low temperature circulation line connecting the first auxiliary low temperature radiator and the central low temperature radiator;
    a second low temperature circulation line connecting the central low temperature radiator and the second auxiliary low temperature radiator and having the second valve;
    a third low temperature circulation line connecting the second auxiliary low temperature radiator and the condenser;
    a fourth low temperature circulation line diverging from the second valve and connected to the third low temperature circulation line;
    a fifth low temperature circulation line connecting the condenser and the integrated cooler;
    a sixth low temperature circulation line connecting the integrated cooler and the first auxiliary low temperature radiator and having the first valve; and
    a seventh low temperature circulation line diverging from the first valve and connected to the first low temperature circulation line.

6. The vehicle engine cooling system of claim 5, wherein when a temperature of the low temperature coolant transmitted from the integrated cooler is lower than a first temperature, the first valve blocks flow of the low temperature coolant to the first auxiliary low temperature radiator.

7. The vehicle engine cooling system of claim 5, wherein when a temperature of the low temperature coolant transmitted from the central low temperature radiator is lower than a preset second temperature, the second valve blocks flow of the low temperature coolant to the second auxiliary low temperature radiator.

8. The vehicle engine cooling system of claim 3, wherein the high temperature radiator circulation line includes:
    a first high temperature circulation line connecting the first auxiliary high temperature radiator and the central high temperature radiator;
    a second high temperature circulation line connecting the central high temperature radiator and the second auxiliary high temperature radiator and having the fourth valve;
    a third high temperature circulation line connecting the second auxiliary high temperature radiator and the engine;
    a fourth high temperature circulation line diverging from the fourth valve and connected to the third high temperature circulation line;

a fifth high temperature line connecting the fourth high temperature circulation line and the integrated cooler;
a sixth high temperature circulation line connecting the engine and the first high temperature circulation line and having the third valve;
a seventh high temperature circulation line connecting the integrated cooler and the third valve; and
an eighth high temperature circulation line connecting the third valve and the first auxiliary high temperature radiator.

9. The vehicle engine cooling system of claim 8, wherein when a temperature of the high temperature coolant transmitted from the integrated cooler is lower than a preset third temperature, the third valve blocks flow of the high temperature coolant to the first auxiliary high temperature radiator.

10. The vehicle engine cooling system of claim 8, wherein when a temperature of the high temperature coolant transmitted from the central high temperature radiator is lower than a preset fourth temperature, the fourth valve blocks flow of the high temperature coolant to the second auxiliary high temperature radiator.

11. The vehicle engine cooling system of claim 1, wherein coolant pumps are provided respectively on the high temperature radiator circulation line and the low temperature radiator circulation line.

12. A vehicle engine cooling system comprising:
an ambient air intake allowing ambient air in front of a vehicle to be introduced to an engine room;
side ducts formed to be symmetrical to guide ambient air in front of the vehicle toward a wheel of the vehicle;
a high temperature radiator including a central high temperature radiator provided in the ambient air intake and first and second auxiliary high temperature radiators provided in both side ducts;
a low temperature radiator including a central low temperature radiator provided in the ambient air intake and first and second auxiliary low temperature radiators respectively provided in both side ducts;
an integrated cooler configured to cool a low pressure EGR gas and air which has passed through a turbocharger by using a coolant of the high temperature radiator and a coolant of the low temperature radiator;
a high temperature radiator circulation line provided to allow the high temperature coolant to circulate the high temperature radiator, an engine, and the integrated cooler;
a low temperature radiator circulation line provided to allow low high temperature coolant to circulate the low temperature radiator, a condenser, and the integrated cooler; and
a plurality of control valves configured to control flow of the coolants.

13. The vehicle engine cooling system of claim 12, wherein the plurality of control valves include:
a first valve configured to control flow of a coolant that passes through the first auxiliary low temperature radiator;
a second valve configured to control flow of a coolant that passes through the second auxiliary low temperature radiator;
a third valve configured to control flow of a coolant that passes through the first auxiliary high temperature radiator; and
a fourth valve configured to control flow of a coolant that passes through the second auxiliary high temperature radiator.

14. The vehicle engine cooling system of claim 13, wherein the integrated cooler includes:
a low temperature unit provided with a low temperature coolant inlet through which the low temperature coolant is introduced and a low temperature coolant outlet through which the low temperature coolant is discharged; and
a high temperature unit provided with a high temperature coolant inlet through which the high temperature coolant is introduced and a high temperature coolant outlet through which the high temperature coolant is discharged,
wherein the air is introduced to the integrated cooler and flows in a direction from the high temperature coolant inlet to the low temperature coolant inlet and
the low pressure EGR gas is introduced to the integrated cooler and flows in a direction from the high temperature coolant outlet to the low temperature coolant outlet.

15. The vehicle engine cooling system of claim 14, wherein the integrated cooler includes an insulating wall configured to block heat transmission between the air and the low pressure EGR gas.

16. The vehicle engine cooling system of claim 13, wherein the low temperature radiator circulation line includes:
a first low temperature circulation line connecting the first auxiliary low temperature radiator and the central low temperature radiator;
a second low temperature circulation line connecting the central low temperature radiator and the second auxiliary low temperature radiator and having the second valve;
a third low temperature circulation line connecting the second auxiliary low temperature radiator and the condenser;
a fourth low temperature circulation line diverging from the second valve and connected to the third low temperature circulation line;
a fifth low temperature circulation line connecting the condenser and the integrated cooler;
a sixth low temperature circulation line connecting the integrated cooler and the first auxiliary low temperature radiator and having the first valve; and
a seventh low temperature circulation line diverging from the first valve and connected to the first low temperature circulation line.

17. The vehicle engine cooling system of claim 16, wherein, when a temperature of the low temperature coolant transmitted from the integrated cooler is lower than a preset first temperature, the first valve blocks flow of the low temperature coolant to the first auxiliary low temperature radiator, and when a temperature of the low temperature coolant transmitted from the central low temperature radiator is lower than a preset second temperature, the second valve blocks flow of the low temperature coolant to the second auxiliary low temperature radiator.

18. The vehicle engine cooling system of claim 13, wherein the high temperature radiator circulation line includes:
a first high temperature circulation line connecting the first auxiliary high temperature radiator and the central high temperature radiator;
a second high temperature circulation line connecting the central high temperature radiator and the second auxiliary high temperature radiator and having the fourth valve;

a third high temperature circulation line connecting the second auxiliary high temperature radiator and the engine;

a fourth high temperature circulation line diverging from the fourth valve and connected to the third high temperature circulation line;

a fifth high temperature line connecting the fourth high temperature circulation line and the integrated cooler;

a sixth high temperature circulation line connecting the engine and the first high temperature circulation line and having the third valve;

a seventh high temperature circulation line connecting the integrated cooler and the third valve; and an eighth high temperature circulation line connecting the third valve and the first auxiliary high temperature radiator.

19. The vehicle engine cooling system of claim 18, wherein, when a temperature of the high temperature coolant transmitted from the integrated cooler is lower than a preset third temperature, the third valve blocks flow of the high temperature coolant to the first auxiliary high temperature radiator, and when a temperature of the high temperature coolant transmitted from the central high temperature radiator is lower than a preset fourth temperature, the fourth valve blocks flow of the high temperature coolant to the second auxiliary high temperature radiator.

20. The vehicle engine cooling system of claim 13, further comprising an active air flap provided in the ambient air intake to selectively block flow of ambient air.

\* \* \* \* \*